(12) United States Patent
Feigl (10) Patent No.: US 10,273,936 B2
(45) Date of Patent: Apr. 30, 2019

(54) WIND TURBINE BLADE MODULES AND WIND TURBINE BLADES

(71) Applicant: Alstom Renewable Technologies, Grenoble (FR)

(72) Inventor: Luca Feigl, Barcelona (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 354 days.

(21) Appl. No.: 15/175,393

(22) Filed: Jun. 7, 2016

(65) Prior Publication Data

US 2016/0369771 A1    Dec. 22, 2016

(30) Foreign Application Priority Data

Jun. 19, 2015 (EP) ..................... 15382328

(51) Int. Cl.
  F03D 1/06    (2006.01)
  F03D 13/10   (2016.01)
  F03D 13/40   (2016.01)

(52) U.S. Cl.
  CPC ........... F03D 1/0675 (2013.01); F03D 13/10 (2016.05); F03D 13/40 (2016.05); *F05B 2240/302* (2013.01); *Y02E 10/721* (2013.01)

(58) Field of Classification Search
  CPC ........ F03D 1/0675; F03D 13/10; F03D 13/40; F05B 2240/302; Y02E 10/721
  See application file for complete search history.

(56) References Cited

U.S. PATENT DOCUMENTS

| 7,901,188 B2 * | 3/2011 | Llorente Gonzalez ...................... F03D 1/0675 416/223 R |
| 9,011,054 B2 * | 4/2015 | Thomsen ................ F03D 13/40 410/120 |
| 2007/0253824 A1 * | 11/2007 | Eyb ....................... F03D 1/0675 416/223 R |
| 2016/0281680 A1 * | 9/2016 | Randall ................. F03D 1/0683 |

* cited by examiner

*Primary Examiner* — Richard A Edgar
(74) *Attorney, Agent, or Firm* — GE Global Patent Operation; Douglas D. Zhang (57) ABSTRACT

Primary blade modules for a wind turbine blade are provided comprising a first blade shell, two opposed spar caps, and at least one shear web. The first blade shell has a root end and a first coupling end configured to be coupled with a secondary blade module. The two opposed spar caps have respective first spar cap portions extending along the first blade shell substantially from the root end to the first coupling end of the first blade shell, and respective second spar cap portions extending beyond the first coupling end. The at least one shear web extends between the opposed spar caps at least partially along the respective first spar cap portions. Secondary blade modules, systems for transporting primary blade modules, and methods of assembling (in situ) wind turbine blades having a primary blade module and a secondary blade module are also provided in the present disclosure.

8 Claims, 7 Drawing Sheets

WIND TURBINE BLADE MODULES AND WIND TURBINE BLADES

TECHNICAL FIELD

The present disclosure relates to wind turbine blade modules, transport systems for transporting such wind turbine blade modules, and methods of assembling such blade modules to form wind turbine blades.

BACKGROUND

Modern wind turbines are commonly used to supply electricity into the electrical grid. Wind turbines generally comprise a rotor with a rotor hub and a plurality of blades. The rotor is set into rotation under the influence of the wind on the blades. The rotation of a rotor shaft drives a generator rotor either directly ("directly driven") or through the use of a gearbox. The gearbox (if present), the generator and other systems are usually mounted in a nacelle on top of a wind turbine tower.

The size/length of wind turbine blades is continuously increasing with the aim of maximizing the capture of kinetic energy from the wind and, therefore, generating larger amounts of electrical energy. The increasing size of the blades may make the transportation of the blades more complex and expensive. Road transportation of very long blades may require considerably long vehicles and trailers, and maritime transportation of enormous blades may similarly require large ships and barges.

It is known that blades may be constructed according to a modular approach, such that different modules or parts of the blade may be transported separately and therefore more cheaply.

However, having a blade composed of separate parts to be coupled to each other (to form the final blade) may require said blade parts to be made of larger amounts of material to ensure acceptable structural stiffness and resistance. In other words, the division of the blade in different parts may negatively affect the structural stiffness and resistance of the final blade. This is normally attenuated or compensated by manufacturing certain blade parts thicker and therefore heavier (i.e. with larger amounts of material) especially around their coupling regions.

Moreover, increased amounts of extra fastening material, which may add considerable extra weight to the final blade, may also be needed for suitably coupling the (thicker and heavier) blade parts together. The increase in additional fastening material (e.g. flanges, screws, bolts, welding, etc.) may be necessary in order to ensure that the final blade is structurally able to withstand all loads.

It is known that, in some particular examples of modular blades, approximately one tonne or more than one tonne of extra weight may be added over a total weight of about fifteen tonnes for the entire/final blade.

It is an object of the present disclosure to provide wind turbine blade modules, systems for transporting said blade modules, and methods of assembling said blade modules to form wind turbine blades that at least partially reduce one or more of the aforementioned drawbacks.

SUMMARY

In a first aspect, a primary blade module for a wind turbine blade is provided. The primary blade module comprises a first blade shell, two opposed spar caps and at least one shear web. The first blade shell has a root end and a first coupling end configured to be coupled with a secondary blade module.

The two opposed spar caps have respective first spar cap portions extending along the first blade shell substantially from the root end to the first coupling end of the first blade shell, and respective second spar cap portions extending beyond the first coupling end. The at least one shear web extends between the opposed spar caps at least partially along the respective first spar cap portions.

The proposed primary blade module may permit bending the second spar cap portions (e.g. upwardly) during transport, so that the space occupied by the primary blade module may be smaller than in the case of complete (non-modular) blades. This bending of the second spar cap portions may be caused when no shear web is arranged between the second spar cap portions at e.g. transport stage. One or more shear webs may be installed between the second spar cap portions when forming a complete blade in situ (i.e. at the location of a wind turbine to be provided with such a blade). The primary blade module may thus be transported by using shorter transport vehicles in comparison with transport vehicles normally used for transporting complete (non-modular) blades. Further details about examples of how primary blade modules may be transported will be provided in other parts of the description.

The suggested primary blade module may be assembled with a further blade module (secondary blade module) to form an entire blade. This complete blade may be formed in such a way that the spar caps (structural elements) of the primary blade module constitute the spar caps of the whole blade. That is, spar caps are not interrupted so that complicated connection between spar cap parts of prior art split blades is avoided. When solving the specific technical challenges linked to assembling blades composed of separate parts, one of the issues which skilled people typically identify as potentially most critical, costly and resource-intensive is the joining of specific blade components such as the spar caps. Such problems can be avoided completely thanks to the inventive wind turbine blade designs and methods described herein.

The complete blade may thus be formed without the necessity of large amounts of extra reinforcing material, especially at coupling regions, in comparison with other types of modular blades having several spar cap parts that have to be assembled. This primary blade module may therefore permit forming a modular or divided blade without excessively increasing the weight of the final blade. In comparison with particular prior art split blades, forming a blade with the proposed primary and secondary blade modules may permit avoiding approximately 1 ton of extra weight.

In a second aspect, a secondary blade module for a wind turbine blade is provided comprising a second blade shell having a second coupling end and a tip end. The second blade shell defines a hollow interior and the second coupling end is configured to be coupled with a primary blade module in such a way that, in use, corresponding portions of one or more spar caps of the primary blade module extends at least partially along the second blade shell.

The proposed secondary blade module may be assembled with a compatible primary blade module (such as the above primary blade module) to form a complete blade in a relatively easy manner. This coupling may be performed in such a way that the second spar cap portions of the primary blade module extend at least partially along the second blade shell of the secondary blade module. Therefore, the spar caps of the primary module constitute a main structural element of the whole blade. Further details about examples of this coupling and its fastening and reinforcement will be provided in other parts of the description.

This secondary blade module may be considerably smaller than the primary blade module, so that its transportation may require less space than in the case of the primary blade module (with second spar cap portions suitably bent). Accordingly, both the primary and secondary blade modules may be transported on the same transport vehicle which may be shorter than the vehicles normally used for transporting entire (non-divided) blades. Furthermore, the coupling between the primary and secondary modules may be positioned at a portion of the blade that is relatively uncritical. That is, the coupling region between blade modules may in examples be closer to the blade tip (where loads are less strong) than to central and root positions of the blade (where loads are stronger).

An entire wind turbine blade may thus be provided comprising a primary blade module such as the one described before and a secondary blade module such as the one described before. The first coupling end of the primary blade module and the second coupling end of the secondary blade module may be configured to be coupled to each other in such a way that, in use, the blade is formed with the second spar cap portions of the primary blade module extending at least partially along the second blade shell of the secondary blade module.

An aspect of this wind turbine blade may be that its transport requires transport vehicles of shorter length in comparison with the vehicles normally used to transport complete/non-modular blades. A further aspect may be that this wind turbine blade can be formed in situ (where wind turbine to be provided with blades is located) by coupling the primary blade module and the secondary blade module to each other in a relatively easy way. A still further aspect of this wind turbine blade may be that only little reinforcement material is required to form the blade, because the spar caps of the primary module are the spar caps of the whole blade, i.e. no assembly between different spar cap parts which are critical for withstanding and transferring loads is needed.

According to examples, the wind turbine blade may further comprise at least one further shear web configured to be arranged in such a way that, in use, said at least one further shear web extends between the opposed spar caps of the primary blade module at least partially along the second spar cap portions of the opposed spar caps. This at least one further shear web may provide an increased structural reinforcement of the final part of the blade constituted by the second spar cap portions and the secondary module when coupled with the primary module.

In some configurations, the at least one further shear web may be configured to be attached to the respective second spar cap portions of the opposed spar caps through adhesives. Additionally, or alternatively, this attachment may be implemented by using other fastening elements such as e.g. one or more screw couplings or elements similar to screws.

In a third aspect, a transport system is provided for transporting a primary blade module such as the one described before. The transport system is configured to transport the primary blade module with the first blade shell arranged substantially horizontally. The transport system comprises at least one cable configured to be attached to the second spar cap portion of at least one of the corresponding spar caps. In some examples, at least one cable for each of the spar caps may be provided. In alternative examples, in the case that only a single cable is provided, the spar caps may be attached to each other through additional fastening element(s). The transport system further comprises a tensioning system configured to tighten the cables in such a way that bending of the second spar cap portions is caused.

The tensioning system is configured to tighten the cables such as to bend the second spar cap portions. The tensioning system, which may comprise a pulley and/or a winch, may be configured to cause the bending of the second spar cap portions upwardly. An aspect of such a tensioning system may be that the space occupied by a primary blade module may be shortened, so that shorter transport vehicles may be used for transporting primary blade modules in comparison with the vehicles normally used to transport complete/non-modular blades.

The tensioning system may be further configured to loosen the tensed cables in such a way that the bending of the second spar cap portions may be at least partially cancelled. This may be beneficial when the vehicle transporting a primary blade module is going to pass under a bridge or through a tunnel and the second spar cap portions are upwardly bent to an excessive height. In this situation, the tensioning system may be operated to loosen the tensed cables for reducing the height (and thus increasing the length of the blade module, or spar caps) to which the second spar cap portions are upwardly bent.

In a fourth aspect, a method is provided of assembling a wind turbine blade such as the one described before, at a location where a wind turbine is to be provided with the assembled blade. The method comprises coupling the primary blade module and the secondary blade module to each other at the first coupling end of the primary blade module and the second coupling end of the secondary blade module. Said coupling may be performed in such a way that the second spar cap portions of the primary blade module are arranged extending at least partially along the second blade shell of the secondary blade module. This attachment may be fastened through fastening elements such as e.g. screws or elements similar to screws, adhesives, etc.

Any of the above assembling methods may be beneficial in the sense that complete blades may be obtained in situ, i.e. where a wind turbine is to be provided with corresponding blades. Blades may be assembled in situ in a relatively easy manner and without adding excessive extra fastening material in comparison with prior art methods that need to assemble different spar cap portions.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
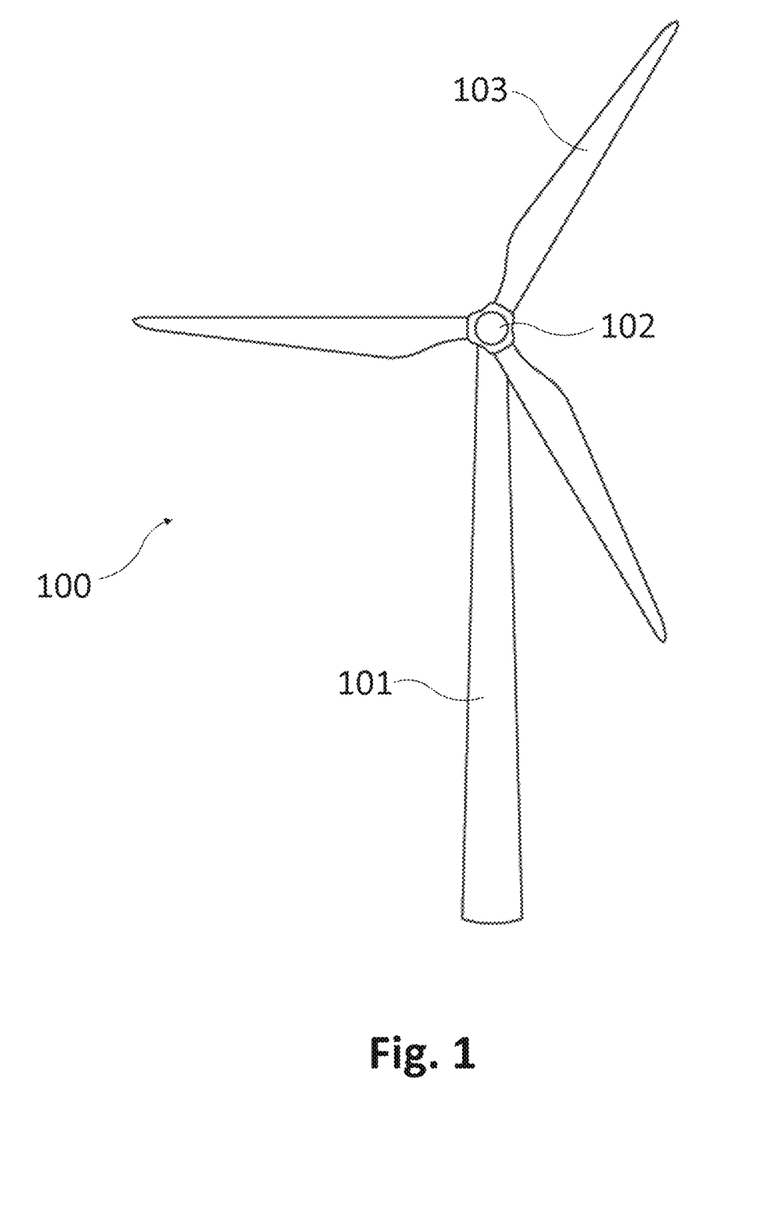
FIG. 1 schematically represents a wind turbine comprising one or more modular blades according to an example.

FIG. 1 schematically illustrates a wind turbine 100 having a tower 101 and a hub 102 mounted on a nacelle (not shown) mounted on the tower 101. The hub 102 is shown carrying a plurality of blades 103. At least some of the blades 103 may be modular blades according to an example.

Figure 2:
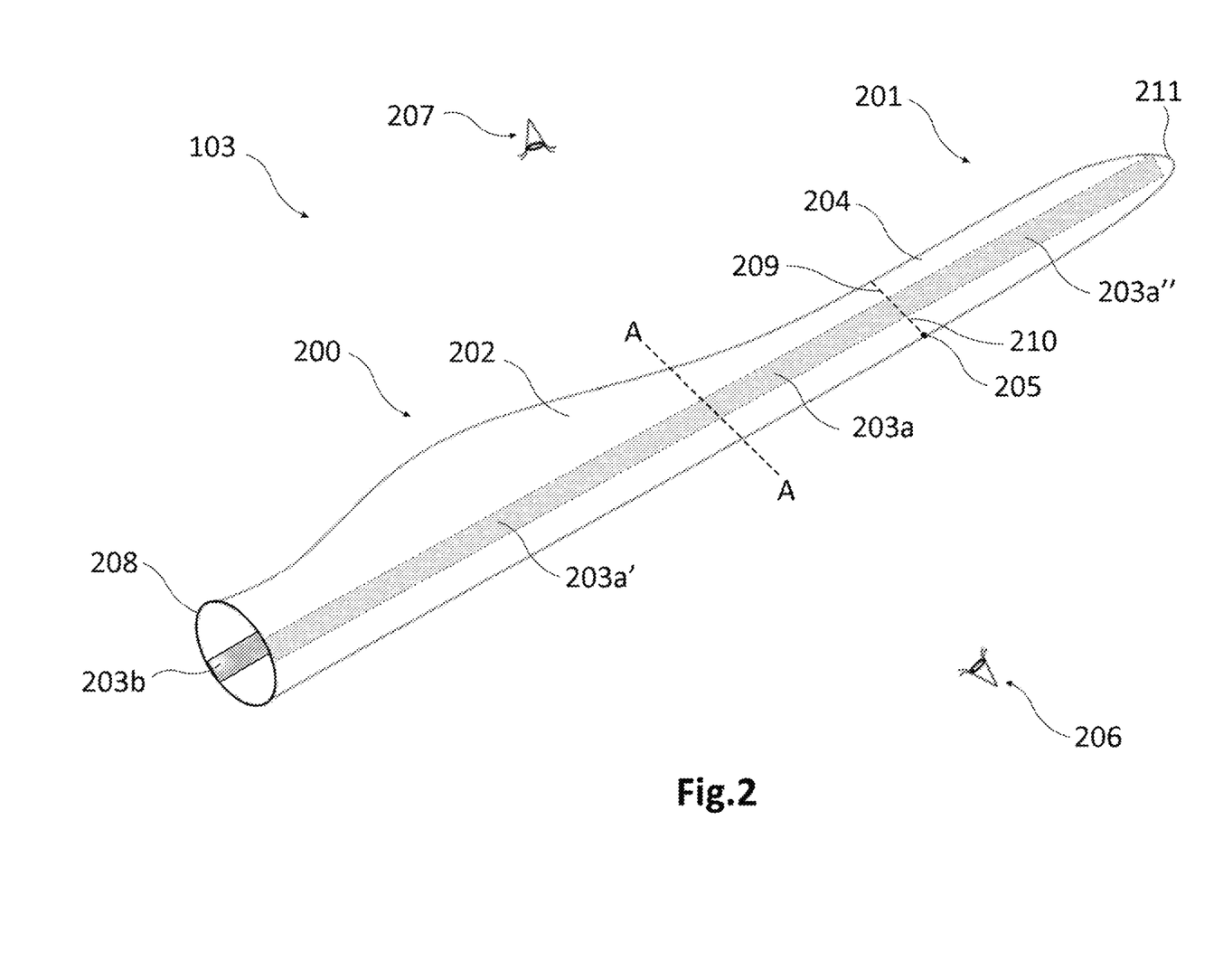
FIG. 2 is a schematic representation of a perspective view of an example of a modular blade similar to the blade of FIG. 1.

FIG. 2 is a schematic representation of a perspective view of an assembled modular blade similar to the blade of FIG. 1. The modular blade 103 is shown comprising a primary blade module 200 and a secondary blade module 201.

The primary blade module 200 may comprise a blade shell 202 having a root end 208 and a coupling end 209, two opposed spar caps 203a, 203b and at least one shear web (not shown). The coupling end 209 may be configured to be coupled with the secondary blade module 201 such that coupling joint 205 is formed. The blade shell 202 may define a hollow interior (not shown).

The two opposed spar caps 203a, 203b may comprise respective first spar cap portions 203a' and respective second spar cap portions 203a" (first and second spar cap portions of spar cap 203b are not shown). First spar cap portions 203a' may extend along the blade shell 202 substantially from the root end 208 to the coupling end 209 of the blade shell 202. Second spar cap portions 203a" may extend beyond the coupling end 209 of the blade shell 202. Spar caps 203a, 203b of the primary blade module 200 may thus constitute a structural element of the whole blade 103.

The at least one shear web (not shown) of the primary blade module 200 may extend between the opposed spar caps 203a, 203b at least partially along the respective first spar cap portions 203a' (first spar cap portion of spar cap 203b is not shown). Details about the structural arrangement formed by spar caps 203a, 203b and shear web(s) are provided in other parts of the description.

The secondary blade module 201 may comprise a blade shell 204 having a coupling end 210 and a tip end 211. The blade shell 204 may define a hollow interior (not shown) as in the case of the blade shell 202 of the primary blade module 200. The blade shell 204 may be a single-body blade shell.

Alternatively, the blade shell 204 may comprise a plurality of panels, such as e.g. a forward panel and an aft panel, configured to be coupled to each other in such a way that the blade shell 204 is formed.

The coupling end 210 of the blade shell 204 may be configured to be coupled with the coupling end 209 of the primary blade module 200 in such a way that the blade 103 is formed. Said coupling may cause the second spar cap portions 203a" of the primary blade module 200 to extend at least partially along the second blade shell 204 of the secondary blade module 201.

In the particular case of FIG. 2, the second spar cap portions 203a" are shown ending before the tip end 211. The second spar cap portions 203a" may be attached to opposed inner surfaces of the blade shell 204 of the secondary blade module 201.

Figure 3:
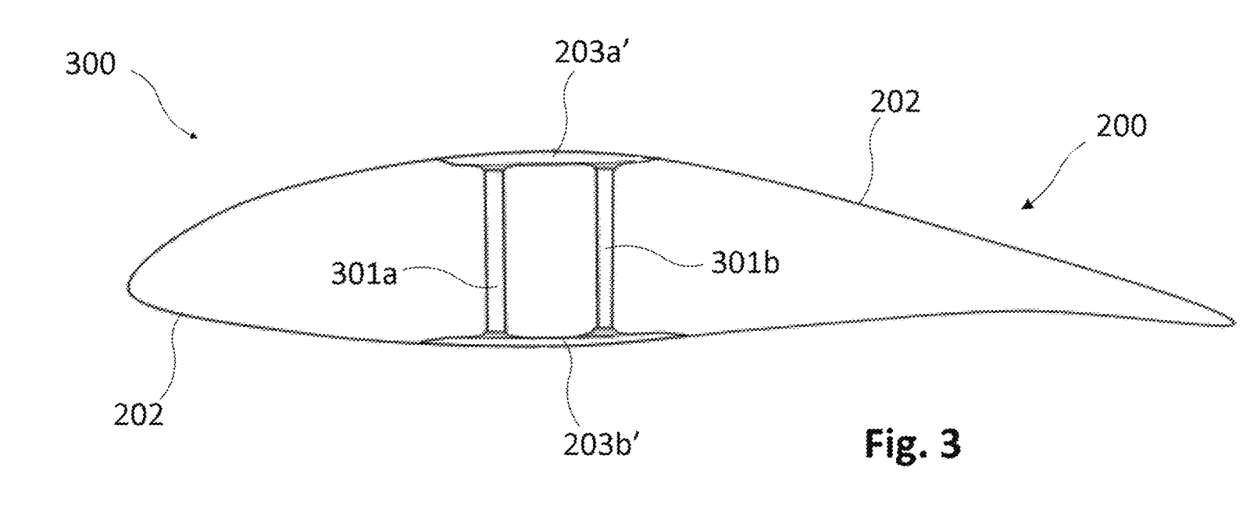
FIG. 3 is a schematic representation of a cross sectional view of an example of a primary blade module of a modular blade similar to the blades of FIGS. 1 and 2.

FIG. 3 is a schematic representation of a cross sectional view 300 of a primary blade module 200 of a modular blade 103 similar to the blades of FIGS. 1 and 2. This cross sectional view 300 may have been taken according to plane AA of FIG. 2. Some reference numbers of FIGS. 1 and 2 have been reused in FIG. 3 to indicate the same or similar elements.

The blade shell 202 of the primary blade module 200 is shown defining the aerodynamic profile of the blade 103. The first spar cap portions 203a', 203b' may be either attached to opposed inner surfaces of the blade shell 202 or integrated within opposed walls of the blade shell 202. Two shear webs 301a, 301b may extend between the first spar cap portions 203a', 203b' of the opposed spar caps, so that the blade shell 202 is structurally reinforced. The shear webs 301a, 301b may be arranged connecting the opposed first spar cap portions 203a', 203b' in a substantially symmetric manner with respect to respective central longitudinal axes of the first spar cap portions 203a', 203b'.

Figure 4A:
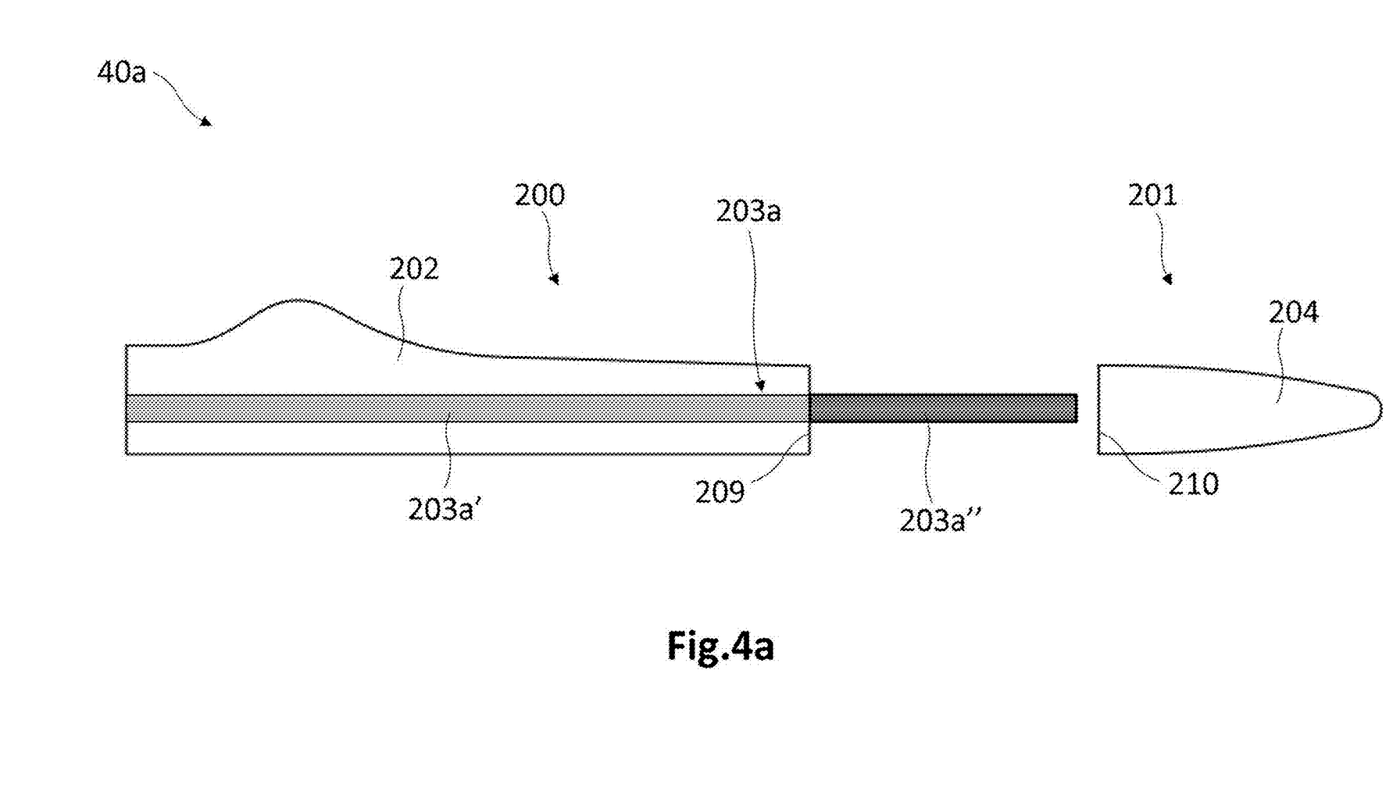
FIGS. 4A and 4B schematically represent respective top exploded views of examples of a modular blade similar to the blades of FIGS. 1 and 2.

FIG. 4A schematically represents a top exploded view 40a of a modular blade similar to the blades of FIGS. 1 and 2. Some reference numbers from previous figures have been reused in FIG. 4A to indicate the same or similar elements. This top exploded view 40a may have been taken from point of view 207 of FIG. 2.

The secondary blade module 201 is shown disassembled or separated from the primary blade module 200. For the sake of understanding, FIG. 4a may be seen as suggesting that the coupling of the secondary blade module 201 with the primary blade module 200 may be performed in a similar way as a pen (primary blade module 200) is capped with corresponding cap (secondary blade module 201). Such a coupling may hence cause the coupling end 209 of the primary module 200 and the coupling end 210 of the secondary module 201 to come into contact to each other. This coupling may be fastened with screws or similar fastening elements.

A transition shell part (not shown) may be used to implement the coupling between blade shells 202, 204. This transition shell part may be configured to be arranged in such a way that blade shells 202, 204 are slightly overlapped by the transition shell part at coupling ends 209, 210. This way, fastening of the coupling between blade shells 202, 204 with e.g. screws may be facilitated. Blade shell 202 and blade shell 204 may be sized with a length substantially equal to half of the length of the whole blade to be formed, for example.

FIG. 4a shows only one spar cap 203a of the two opposed spar caps 203a, 203b (see FIG. 3) because spar cap 203b is hidden by spar cap 203a and therefore not visible. Second spar cap portion 203a" is depicted with thicker lines than first spar cap portion 203a' to indicate that first spar cap portion 203a' is not be visible because it is hidden by shell 202, while second spar cap portion 203a" is not hidden by shell 204 of the secondary blade module 201.

Figure 4B:
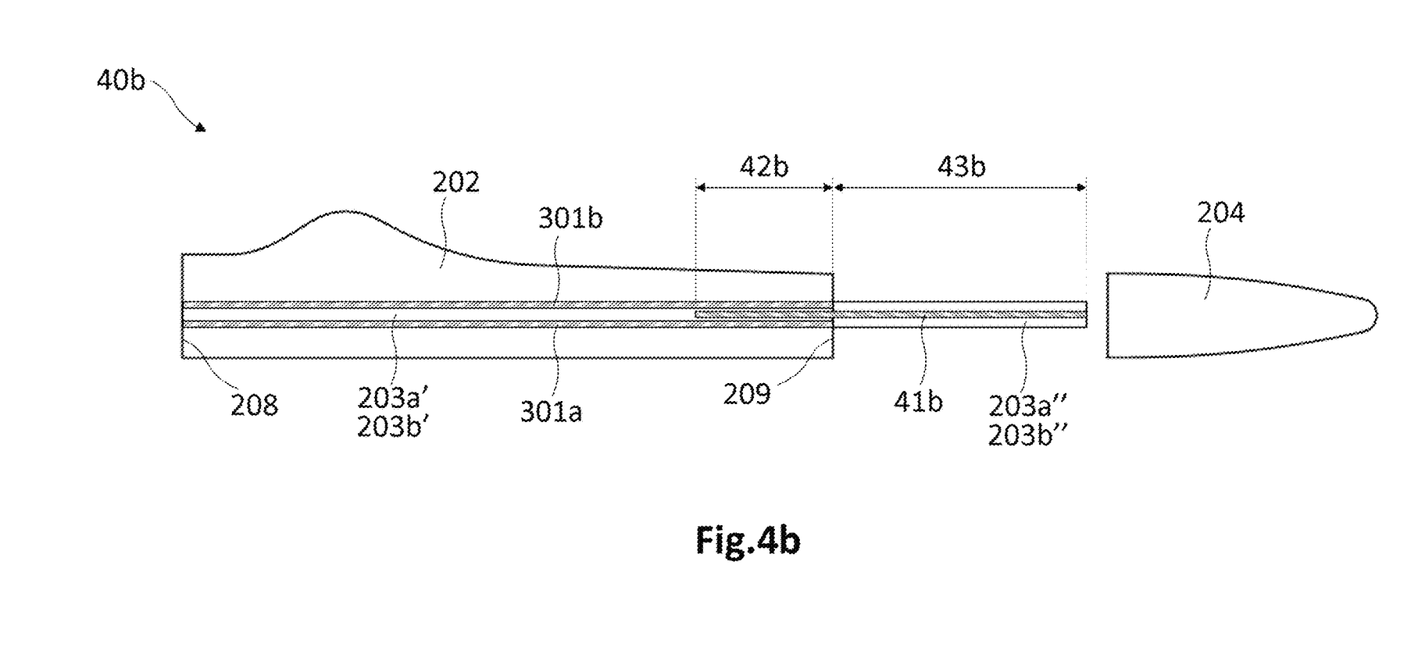

FIG. 4B schematically represents a view 40b similar to the view 40a of FIG. 4A. FIG. 4b differs from FIG. 4A in that FIG. 4B is aimed at showing a possible configuration of main shear webs 301a, 301b and further shear web 41b. Some reference numbers from previous figures have been reused in FIG. 4B to indicate the same or similar elements.

Main shear webs 301a, 301b may extend between first spar cap portions 203a', 203b' along the entire length of blade shell 202, i.e. from root end 208 to coupling end 209. Main shear webs 301a, 301b may be symmetrically disposed with respect to respective central longitudinal axes of first spar cap portions 203a', 203b'.

Further shear web 41b may be arranged, e.g. during assembly of the blade in situ, with a portion 43b extending between second spar cap portions 203a", 203b" and along their complete length, and with a portion 42b between part of first spar cap portions 203a', 203b'. Further shear web 41b may be symmetrically disposed with respect to respective central longitudinal axes of first spar cap portions 203a', 203b' and second spar cap portions 203a", 203b".

An aspect of this configuration, which is based on overlapping part of main shear webs 301a, 301b and part of further shear web 41b, may be that an increased reinforcement may be implemented at coupling region between blade shell 202 and blade shell 204.

Figure 5:
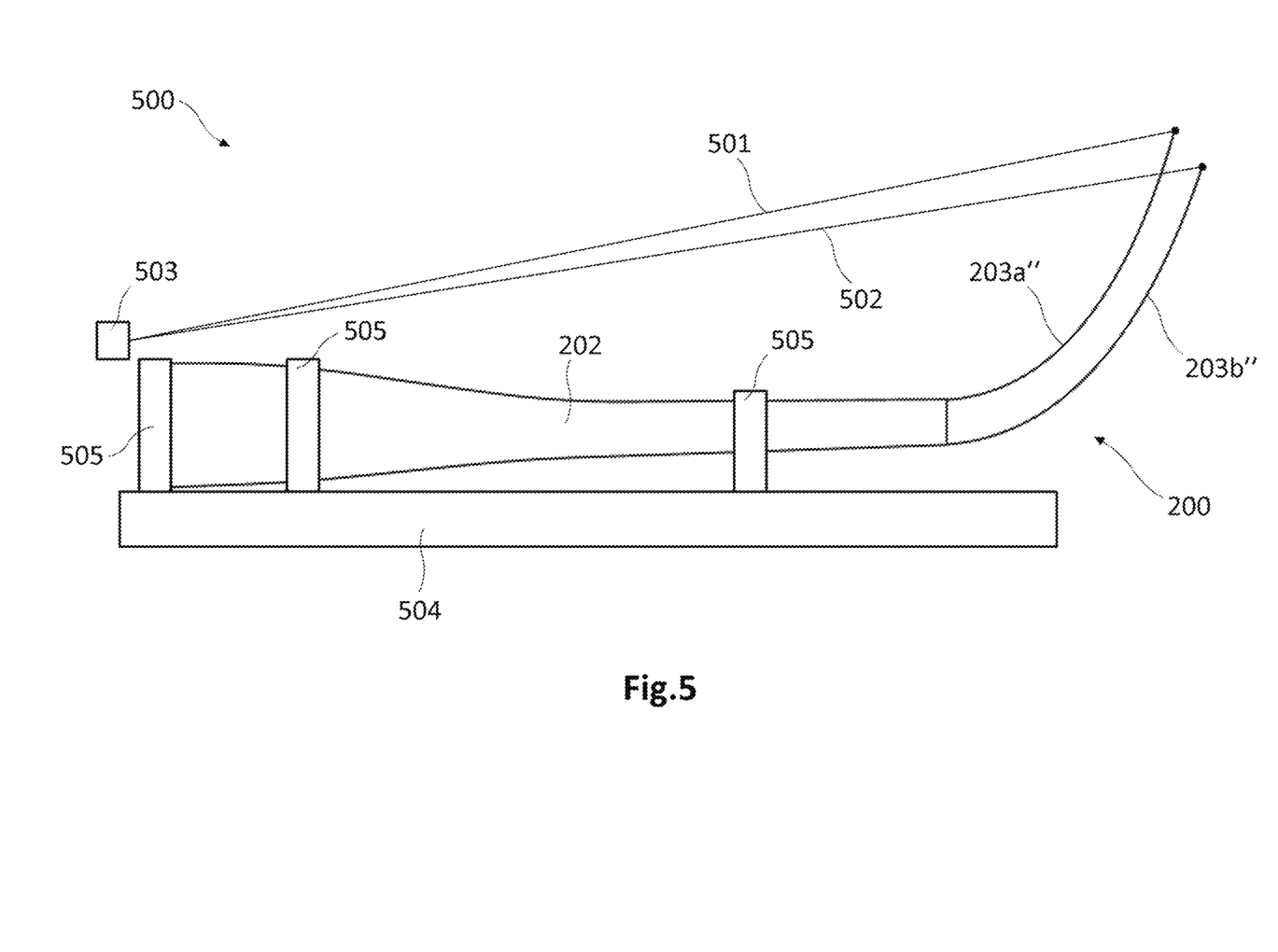
FIG. 5 schematically represents a lateral view of an example of a primary blade module of a modular blade similar to the blades of FIGS. 1, 2 and 3, and a transport system according to an example.

FIG. 5 schematically represents a lateral view 500 of a primary blade module 200 of a modular blade similar to the blades of FIGS. 1, 2 and 3, and a transport system according to an example. Some reference numbers from previous figures have been reused in FIG. 5 to indicate the same or similar elements.

The transport system may be configured to transport the primary blade module 200 with its blade shell 202 arranged substantially horizontally on e.g. a transport platform 504. In the particular case shown, the transport system may comprise fastening elements 505 to keep the blade shell 202 fastened to the transport platform 504 and substantially horizontally arranged.

The transport system may further comprise a cable 501, 502 for each of the second spar cap portions 203a", 203b" of the opposed spar caps of the primary blade module 200. Each cable 501, 502 may have a distal end or appendage configured to be attached to the corresponding second spar cap portion 203a", 203b". In the particular case of FIG. 5, cable 501 is shown with a distal end attached to an end of the second spar cap portion 203a", and cable 502 is shown with a distal end attached to an end of the second spar cap portion 203b".

The transport system may further comprise a tensioning system 503 configured to tighten the cables 501, 502 in such a way that bending of the second spar cap portions 203a", 203b" is caused. As illustrated in FIG. 5, this bending may be caused upwardly to a considerable height. With this bending of the second spar cap portions 203a", 203b", shorter transport vehicles may be used in comparison with the vehicles that are normally used for transporting complete (non-modular) blades.

The tensioning system 503 may comprise e.g. a pulley and/or a winch configured to wind/unwind the cables 501, 502 in such a way that the cables 501, 502 are tighten/loosen when required. For instance, when a vehicle that is transporting primary blade modules 200 is going to pass under a bridge or tunnel, it may not be possible because the second spar cap portions 203a", 203b" are upwardly bent to an excessive height. In these circumstances, the pulley and/or winch 503 may be operated to loosen the cables 501, 502 and reduce the height to which the second spar cap portions 203a", 203b" are upwardly bent, so that the vehicle can pass under the bridge. Once the vehicle has passed under the bridge, the pulley and/or winch 503 may be operated again to tighten the cables 501, 502 and return the second spar cap portions 203a", 203b" to the previous position. Other systems for tightening and untightening may also be foreseen.

Secondary blade modules 201 to be assembled with the primary blade modules 200 may be transported in the same vehicle or in another vehicle of more reduced dimensions, for example. Once transported, each primary blade module 200 may be assembled in situ with its corresponding secondary blade module 201 to form a final/complete wind turbine blade.

Figure 6:
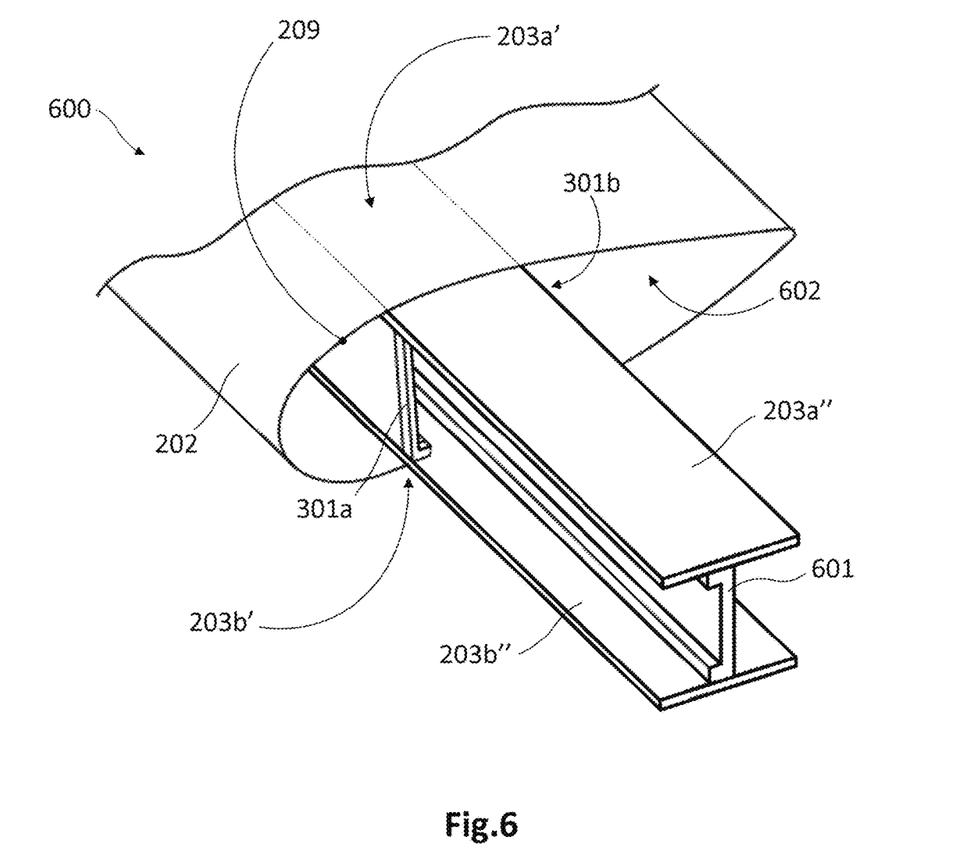
FIG. 6 is a schematic illustration of a portion of a primary blade module of a modular blade similar to the blades of FIGS. 1, 2 and 3.

FIG. 6 is a schematic illustration of a perspective view 600 of a portion of a primary blade module of a modular blade similar to the blades of FIGS. 1, 2 and 3. Some reference numbers from previous figures have been reused in FIG. 6 to indicate the same or similar elements. This view shows a portion of a primary blade module 200 around its coupling end 209, said portion therefore comprising a part of shell 202, spar caps 203a, 203b, shear webs 301a, 301b, etc.

The shear webs 301a, 301b may be arranged connecting the first spar cap portions 203a', 203b' in a substantially symmetric manner with respect to respective central longitudinal axes of the first spar cap portions 203a', 203b'.

A further shear web 601 is shown arranged connecting the second spar cap portions 203a", 203b" along respective central longitudinal axes of the second spar cap portions 203a", 203b".

The first spar cap portions 203a', 203b' and the shear webs 301a, 301b constitute a structural element of a main part of the blade that may receive the strongest loads. Hence, having two shear webs 301a, 301b to reinforce said main part of the blade may be a very suitable choice.

The second spar cap portions 203a", 203b" and the further shear web 601 constitute a structural element of a final part of the blade which may receive less strong loads. Having a single shear web 601 to reinforce said less principal part of the blade may suffice to withstand loads. However, in alternative configurations, more than one further shear web 601 may be used to connect the second spar cap portions 203a", 203b" and thus provide a stronger reinforcement of the final part of the blade.

The further shear web(s) 601 may extend completely or partially along the second spar cap portions 203a", 203b". In the particular case of FIG. 6, the further shear web 601 is shown extending completely along the second spar cap portions 203a", 203b". The further shear web 601 may be coupled in situ with the second spar cap portions 203a", 203b" through adhesives, screws or similar fastening elements.

The shell 202 is shown defining a hollow interior 602 around the structural first spar cap portions 203a', 203b' and shear webs 301a, 301b. The further shear web(s) 601 may be transported suitably arranged in said chamber 602, for example. Once primary and secondary blade modules 200, 201 have been transported to the location of the wind turbine to be provided with blades, said blade modules 200, 201 may be assembled in situ to form a final blade to be mounted to corresponding hub. Before this assembly, the shear web 601 may be extracted from chamber 602 and attached between the second spar cap portions 203a", 203b" as shown in FIG. 6. This attachment may be implemented by using adhesives, screws or similar fastening elements.

Any of the blade modules of the previous examples may be manufactured separately by considering at least some of the following fabrication principles.

The blade spar caps 203a, 203b and/or shear webs 301a, 301b, 601 may be made of unidirectional fibers and resin. The unidirectional fibres may be glass fibres, carbon fibres, etc. The resin may be a bonding resin, such as e.g. epoxy, polyester, vinyl ester, etc. A vacuum infusion process may be used to fabricate said blade spar caps 203a, 203b and/or shear webs 301a, 301b, 601.

The blade shells 202, 204 may be made of multidirectional fibres and resin. The multidirectional fibres may comprise fibres crossed at substantially 45 degrees relative to a longitudinal axis of the blade shell. The multidirectional fibres may be glass fibres, carbon fibres, etc. The resin may be a bonding resin, such as e.g. epoxy, polyester, vinyl ester, etc. A vacuum infusion process may be used to fabricate the blade shells 202, 204.

In any case (spar caps, shear webs, shells) a suitable mould may be used to perform the vacuum infusion process by creating a vacuum and introducing the resin in the mould. The mould may comprise a heating system for heating the inside of the mould and curing the infused resin.

The vacuum is used to reduce the pressure at one end of the inside of the mould (containing the fibres to be attached together) thus allowing atmospheric pressure to force the resin through the gaps between the fibres.

Once the resin has been introduced, operation of the heating system may be caused in order to cure the resin and therefore completing the attachment between fibres.

The moulds used for infusion processes may be cheap. Furthermore, the infusion process may use slightly lower performance resins (in terms of strength) due to a low viscosity requirement for facilitating the resin infusion. The infusion process is thus usually considered to be a cheap process.

An aspect of implementing such an infusion process may be that the resin may substantially completely fill the gaps between the fibres. Therefore, junctions substantially without air "bubbles" between fibres may be achieved with this option.

A primary blade module 200 may be manufactured by carrying out two infusion processes. A first infusion process may be performed to fabricate the spar caps 203a, 203b by suitably placing unidirectional fibres into the mould and infusing the resin. Infusion of the resin may cause optimal flow of the resin between fibres and their posterior attachment as a result of suitably curing the resin.

A second infusion process may be carried out to fabricate the shell 202 with the spar caps 203a, 203b integrated therein. Said second infusion process may comprise placing the pre-fabricated spar caps 203a, 203b and multidirectional fibres into the mould and infusing the resin. Infusion of the resin may cause optimal flow of the resin between spar caps 203a, 203b and multidirectional fibres and their posterior attachment as a result of suitably curing the resin. In both infusion processes, the curing of the resin may be caused by properly operating a heating system of the mould to heat the inside of the mould.

In a further fabrication step, the shear webs 301a, 301b may be manufactured based on an infusion process in a similar way as the spar caps 203a, 203b, for example. Once fabricated, the shear webs 301a, 301b may be incorporated between the spar caps 203a, 203b as described in other parts of the description. The shear webs 301a, 301b may be coupled to the spar caps 203a, 203b by using adhesives, screws or similar fastening elements.

The spar caps 203a, 203b of the primary blade module 200 constitute a main structural element of the whole blade 103 (when assembled). Hence, the spar caps 203a, 203b may suffer all or most of bending loads on the blade 103.

Taking this into account, the spar caps 203a, 203b may be made of continuous unidirectional fibres attached together with resin, as described before. A relevant aspect of such one-piece (i.e. non-divided) spar caps 203a, 203b with continuous unidirectional fibres may be that they may withstand bending loads on the entire blade with effectiveness. In prior art blades with divided spar caps, the spar cap parts may be thicker and heavier, but even in this case the assembled spar caps may not be as effective as the proposed one-piece spar caps 203a, 203b.

Although only a number of examples have been disclosed herein, other alternatives, modifications, uses and/or equivalents thereof are possible.

Furthermore, all possible combinations of the described examples are also covered. Thus, the scope of the present disclosure should not be limited by particular examples, but should be determined only by a fair reading of the claims that follow.

What is claimed is:

1. A blade for a wind turbine, comprising a primary blade module and a secondary blade module,
    wherein the primary blade module comprises:
        a first blade shell having a root end and a first coupling end configured to be coupled with the secondary blade module,
        two opposed spar caps with respective first spar cap portions extending along the first blade shell from the root end to the first coupling end of the first blade shell, and respective second spar cap portions extending beyond the first coupling end of the first blade shell, and
        two shear webs extending between the opposed spar caps at least partially along the respective first spar cap portions,
    wherein the secondary blade module comprises:
        a second blade shell having a second coupling end and a tip end,
    wherein the first coupling end of the primary blade module and the second coupling end of the secondary blade module are configured to be coupled to each other in such a way that the blade is formed with the second spar cap portions of the primary blade module extending at least partially along the second blade shell of the secondary blade module,
    the blade further comprises a second shear web that extends along the second spar cap portions and partially along the first spar cap portions so that there is an overlap between the first two shear webs and the second shear web.

2. The blade of claim 1, wherein the second shear web is configured to be attached to the respective second spar cap portions of the opposed spar caps through adhesives or one or more screw couplings.

3. The blade of claim 1, wherein the first coupling end of the primary blade module and the second coupling end of the secondary blade module are configured to be coupled to each other through one or more screw couplings.

4. The blade of claim 1, wherein the two shear webs terminate at the first coupling end of the primary blade module.

5. A method of assembling a blade for a wind turbine, from a primary blade module and a secondary blade module, at a location where the wind turbine is to be provided with the blade,
    wherein the primary blade module comprises:
        a first blade shell having a root end and a first coupling end configured to be coupled with the secondary blade module,
        two opposed spar caps with respective first spar cap portions extending along the first blade shell from the root end to the first coupling end of the first blade shell, and respective second spar cap portions extending beyond the first coupling end of the first blade shell, and
        two shear webs extending between the opposed spar caps at least partially along the respective first spar cap portions,
    wherein the secondary blade module comprises:
        a second blade shell having a second coupling end and a tip end, the method comprising:
coupling in situ the primary blade module and the secondary blade module to each other at the first coupling end of the primary blade module and the second coupling end of the secondary blade module, in such a way that the second spar cap portions of the primary blade module are arranged extending at least partially along the second blade shell of the secondary blade module, and connecting in situ the second spar cap portions of the primary blade module by arranging a second shear web between the second spar cap portions in such a way that the second shear web extends at least partially along the second spar cap portions and partially along the first spar cap portions so that there is an overlap between the first shear webs and the second shear web.

6. The assembling method according to claim 5, further comprising attaching the second spar cap portions of the primary blade module to opposed inner surfaces of the second blade shell of the secondary blade module.

7. The assembling method according to claim 5, wherein the second shear web is arranged between the second spar cap portions of the primary blade module substantially along respective central longitudinal axes of the second spar cap portions.

8. The assembling method according to claim 5, wherein the two shear webs terminate at the first coupling end of the primary blade module.

* * * * *